March 14, 1961 K. E. GREEN ET AL 2,975,263
METHOD FOR PRODUCING HONEYCOMB STRUCTURES
Filed July 6, 1954 3 Sheets-Sheet 1
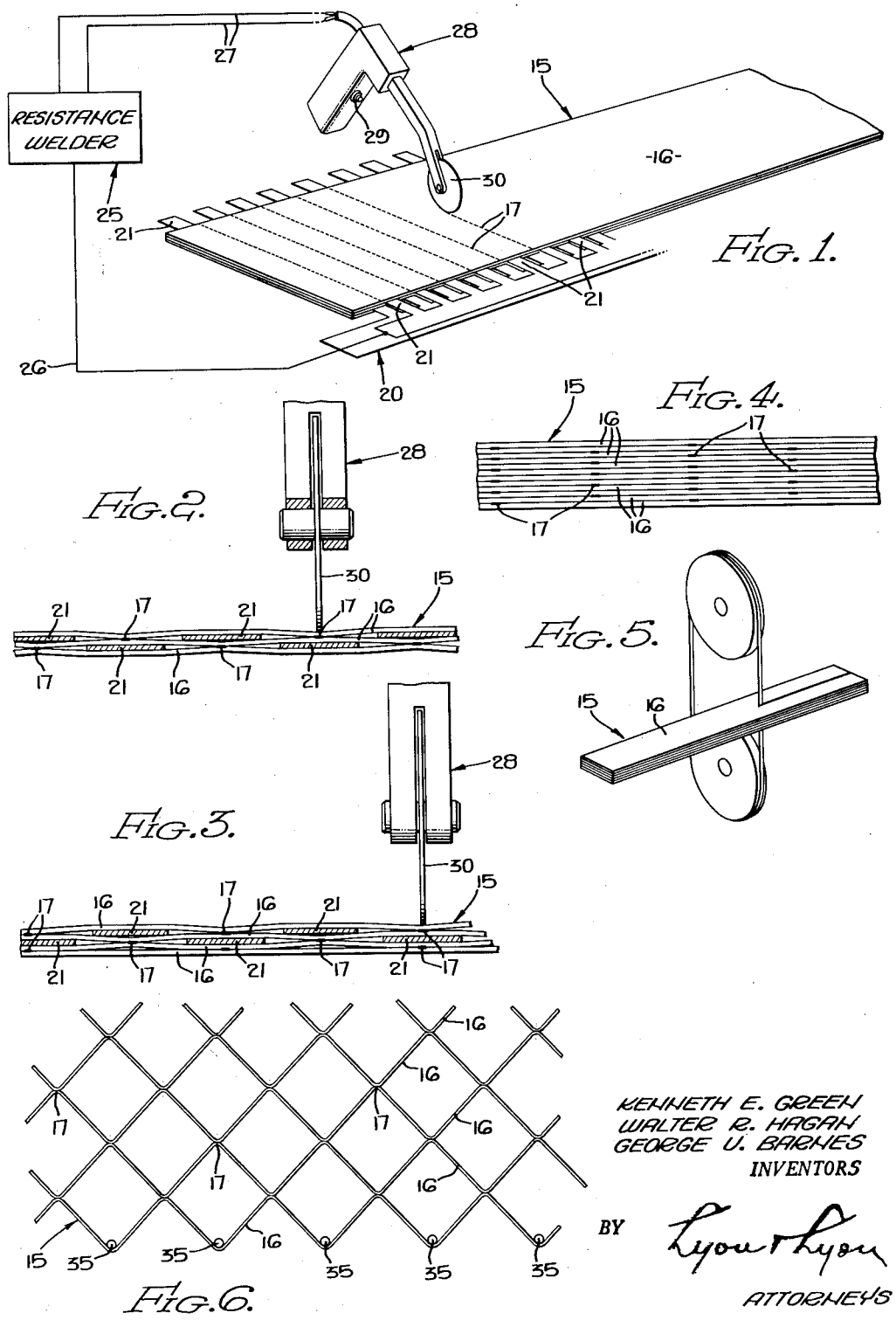
KENNETH E. GREEN
WALTER R. HAGAN
GEORGE U. BARNES
INVENTORS
BY *Lyon  Lyon*
ATTORNEYS March 14, 1961 K. E. GREEN ET AL 2,975,263
METHOD FOR PRODUCING HONEYCOMB STRUCTURES
Filed July 6, 1954 3 Sheets-Sheet 2

KENNETH E. GREEN
WALTER R. HAGAN
GEORGE U. BARNES
INVENTORS

BY Lyon & Lyon
ATTORNEYS

March 14, 1961 K. E. GREEN ET AL 2,975,263
METHOD FOR PRODUCING HONEYCOMB STRUCTURES
Filed July 6, 1954 3 Sheets-Sheet 3

KENNETH E. GREEN
WALTER R. HAGAN
GEORGE U. BARNES
INVENTORS

BY Lyon+Lyon
ATTORNEYS

United States Patent Office 2,975,263
Patented Mar. 14, 1961

2,975,263

METHOD FOR PRODUCING HONEYCOMB STRUCTURES

Kenneth E. Green and Walter R. Hagan, Santa Ana, and George U. Barnes, Laguna Beach, Calif., assignors to John J. Foster Mfg. Co., Santa Ana, Calif., a corporation of California Filed July 6, 1954, Ser. No. 441,306

4 Claims. (Cl. 219—83)

This invention relates to structural materials and has particular reference to methods and apparatus for producing structural parts of the metallic honeycomb core type.

Honeycomb core sandwich structures have found wide usage in recent years, primarily in aircraft due to the light weight and high strength of such structures. The honeycomb cores have been generally formed of resin-impregnated fabric or aluminum sheets suitably adhered together at spaced points by means of a resin-type adhesive to form a honeycomb wherein the configuration of the individual cells is basically hexagonal. Such structures, while highly satisfactory for many applications, are subject to the limitations imposed by the nature of the core material and/or the adhesive used and hence are not suitable for applications wherein high temperatures are experienced, as in parts used in the vicinity of jet engines and the like. Accordingly, one of the principal objects of this invention is to provide a honeycomb core structure composed of heat-resistant metallic foil elements welded together to form the cell configuration without the use of adhesive materials which are subject to thermal breakdown.

Another object of this invention is to provide novel methods and apparatus for forming honeycomb core structures of metallic elements thermally welded together.

Another object of this invention is to provide novel methods and apparatus for the production of honeycomb core structures having a basically square cell configuration and which hence have a lower density than structures otherwise similar but having a hexagonal cell configuration.

Another object of this invention is to provide methods for the production of welded honeycomb core structures, which methods are highly effective, yet quite simple and adapted to be carried out by relatively unskilled personnel.

Other objects and advantages of this invention it is believed will be readily apparent to those skilled in the art from the following detailed description of preferred embodiments thereof when read in connection with the accompanying drawings.

In the drawings:

Figure 1 is a schematic perspective view illustrating a method for producing welded honeycomb core structures in accordance with the invention.

Figures 2 and 3 are fragmentary vertical sectional views illustrating successive steps in the welding operation.

Figure 4 is a fragmentary vertical sectional view illustrating the core structure before expansion of the same.

Figure 5 is a diagrammatic perspective view illustrating the step of cutting the core structure before expansion of the same.

Figure 6 is a fragmentary top plan view of the expanded core structure.

Figure 7:
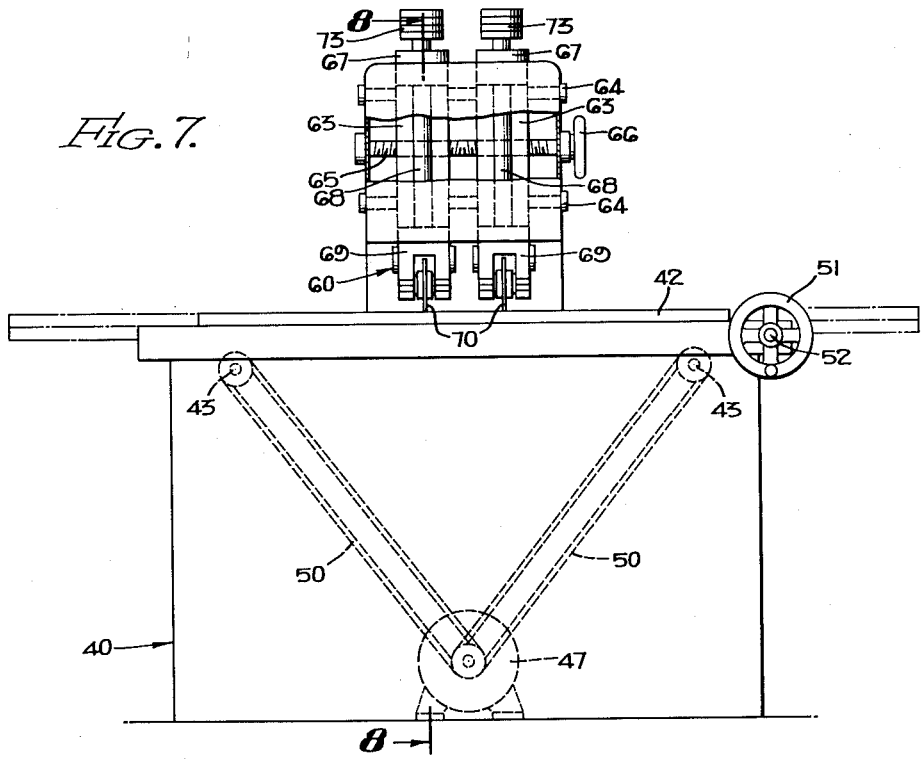
Figure 7 is a front elevation of an apparatus used in carrying out a modified method in accordance with the invention.

Referring now to the drawings, the core structure 15 of this invention is shown before expansion in Figure 4 and after expansion in Figure 6, and comprises a plurality of initially planar thin metallic sheets 16, each sheet being welded to the next adjacent sheet on transverse weld lines or seams 17 at spaced intervals, the weld lines of each pair of sheets being staggered with respect to those of the next adjacent pair of sheets as shown so as to produce the square cell shape in the expanded core as shown in Figure 6.

In producing the core structure 15 in accordance with a preferred method of this invention, the first step is to clamp together a pair of sheets 16 with a combined electrode and sheet-spacer member 20 interposed therebetween. This member 20 is preferably formed of copper sheeting and is constructed in the general shape of a comb, the teeth or fingers 21 of which are spaced on centers conforming to the desired spacing of the seam welds 17. A resistance welding unit 25 is provided. This unit, which comprises a multi-tap transformer (not shown), a multi-stage potentiometer (not shown) and a solenoid type on-off switch (not shown), forms no part of this invention as such, and since resistance welders of this type are known to those skilled in the art, is not shown or described in detail. One conductor 26 from the welding unit is electrically connected by means of a clamp (not shown) to the comb member 20 which forms one welding electrode, and the other pair of conductors 27 is connected to a hand operated wheel type welding gun 28 provided with a micro-switch 29, the wheel 30 of the gun forming the other electrode to complete the welding circuit.

In carrying out the second step of the process with the welding gun 28 turned on, the operator draws the wheel 30 across the uppermost sheet 16 and along a transverse line coincident with the center of the end finger of the comb member, applying sufficient pressure to produce a seam-type weld between the two sheets. It will be understood that the welding is accomplished by means of the heat generated as a result of the electrical resistance of the metal being fabricated, when subjected to the electric current. The weld is a function of heat and pressure, the heat being controlled by the potentiometer to produce weld spots at the rate of 120 per second. This welding operation is continued progressively along the uppermost sheet 16 until the two sheets have been provided with a plurality of welds therebetween, one for each finger of the comb member. It will thus be understood that the comb member functions both as an electrode for the welding operation and as a spacer or insulator to prevent welding together of more than two adjacent sheets. A second comb member is then placed on the uppermost sheet 16 and another sheet 16 placed thereupon, and the process repeated. As will be seen from an inspection of Figures 1 and 2, the second comb member is placed so that the fingers thereof are staggered with respect to the first comb member so that the welds of the two pairs of sheets are likewise staggered. After welding the third sheet to the second sheet, the first (lower) comb member is removed and placed on top of the third sheet, and a fourth sheet placed thereupon in position for further welding (Figure 3). This process of addition of sheets and welding them to the next lower sheet is carried on until the desired number of sheets have been welded together to provide the completed, unexpanded core structure shown in Figure 4. This structure may be worked in the same manner as a piece of bar stock, as shown in Figure 5 which illustrates a cutting operation. The core structure is preferably machined to the desired thickness after expansion, by a grinding operation.

The final step is to expand the shaped structure. As indicated in Figure 6, this is accomplished by engaging the lowermost sheet 16 with stationary pegs or pins 35 and exerting a uniform pull on the uppermost sheet 16 to produce the structure shown. The expanded core is then utilized in the usual manner, usually being provided with skin elements (not shown) to form the desired sandwich structure.

Core structures have been produced, in accordance with the above-described method, from mild steel, stainless steel alloys and commercially pure titanium, although it will be readily understood that the invention is not inherently limited to these materials. While not so shown, the sheets 16 are preferably perforated throughout their entire areas so as to avoid build-up of pressure in the completed sandwich structure. Additionally, core in the already expanded condition has been produced in accordance with said method. Here, however, the sheets were pre-formed and the comb fingers were of square configuration.

Figure 8:
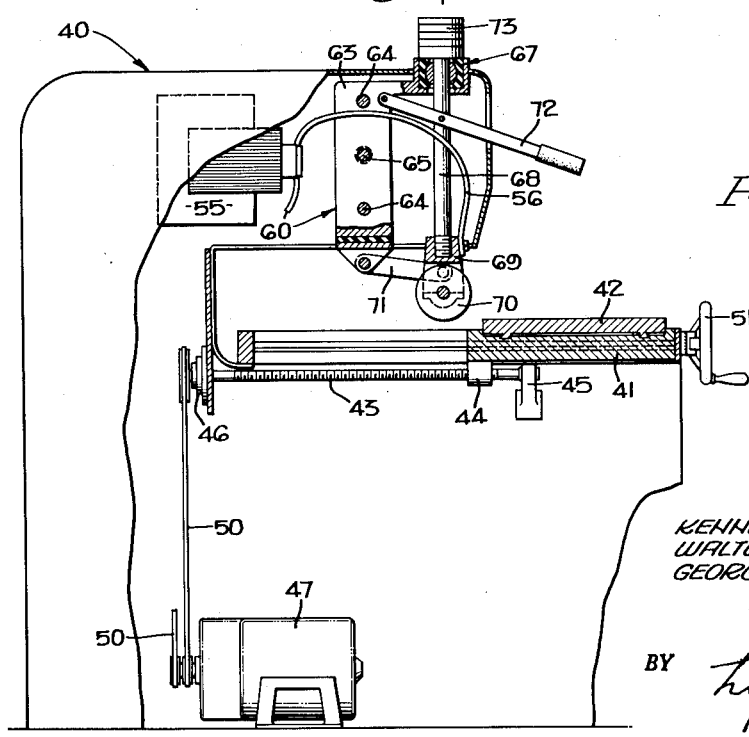
Figure 8 is a sectional elevation taken substantially on the line 8—8 of Figure 7.

In Figures 7 and 8 is illustrated an apparatus utilized in carrying out a semi-automatic process for producing the honeycomb core. The apparatus includes a frame 40 on which is slidably carried a table member 41, the table member in turn carrying a longitudinally movable platen 42. Means are provided for automatically reciprocating the table with respect to the frame and as shown in the drawings these means may include the pair of lead screw members 43 which engage in nut elements 44 on the table member, the lead screw members being journalled in suitable bearing members 45 and 46 on the frame, and being driven by the reversible motor 47 through belt transmissions 50. Limit switches (not shown) stop the motor at the extreme end positions of the table member. A hand wheel 51 is keyed to a shaft 52 which carries a pinion (not shown) cooperating with a rack (not shown) on the platen 42 for controlled longitudinal movement of the platen with respect to the table member.

A resistance welding unit 55 is secured to the frame 40 and is electrically connected by means of the flexible conductor 56 to the wheeled welding electrode unit generally indicated 60 which consists of a pair of identical electrode assemblies including support members 63 supported on transverse pins 64 and transversely adjustable by means of a lead screw 65 operable by hand wheel 66. Each of the support members carries a rubber mounted ball bushing 67 through which an electrode rod 68 projects, the rods supporting at their lower ends fork members 69 in which are journalled the electrode wheels 70. The fork and electrode members are operably connected to the support members by means of links 71 at the bottom thereof and a forked hand lever 72 at the upper portions thereof, forming parallelograms for vertical movement of the electrode wheels. Easily exchangeable weights 73 are provided at the top of the electrode rods for control of the pressure exerted by the electrode wheels.

Figure 10:
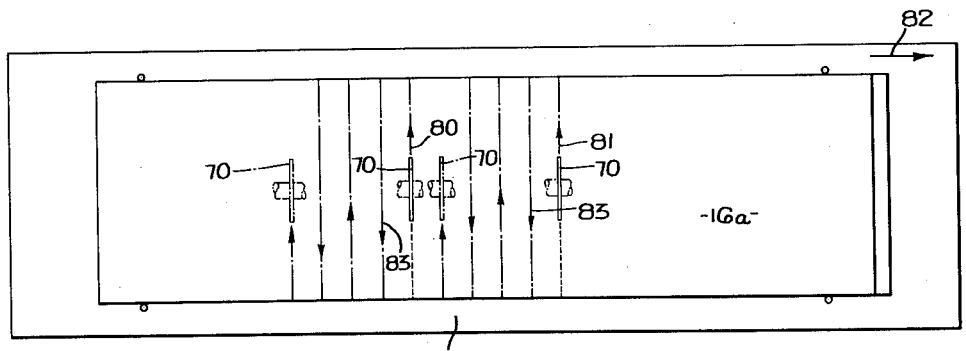
Figures 10 and 11 are diagrammatic plan views illustrating successive steps in carrying out the modified welding method.

The machine as thus described may be used in carrying out the process described above. That is, the sheets and comb members may be manipulated on the platen of the machine, rather than using the hand operated welding gun previously described, the platen being provided with pins (not shown) for properly positioning the sheets. In operation of the machine, welding is begun at approximately the center of the sheets to be welded. Reciprocation of the table member to form two seam welds simultaneously is automatic, through operation of the lead screws 43 by means of the motor 47. Referring to Figure 10 it will be seen that the first pair of welds is made with the wheels 70 moving in the direction of the arrows 80 and 81. Upon completion of this weld, the wheels are moved upwardly by means of the hand lever 72 thus opening the welding circuit, the platen is moved in the direction of the arrow 82 by means of the hand wheel 51 a distance equal to the desired spacing between welds, and the hand lever is lowered to cause the second pair of welds to be made while the table is moving in the opposite direction (arrows 83). This process is repeated, as indicated by the arrows in Figure 10, until the platen has been moved a distance equal to the space between the rollers, whereupon, in order to avoid overlap, the platen is again moved the same distance and welding is again begun (see Figure 11). Upon completion of one half of the welding operation, the platen is moved in the other direction to complete the other half. The remainder of the process is the same as that described above in that upon completion of one pair of sheets, another comb member is placed upon the top sheet, with another sheet placed thereupon, and the process repeated to weld together the two uppermost sheets.

Figure 9:
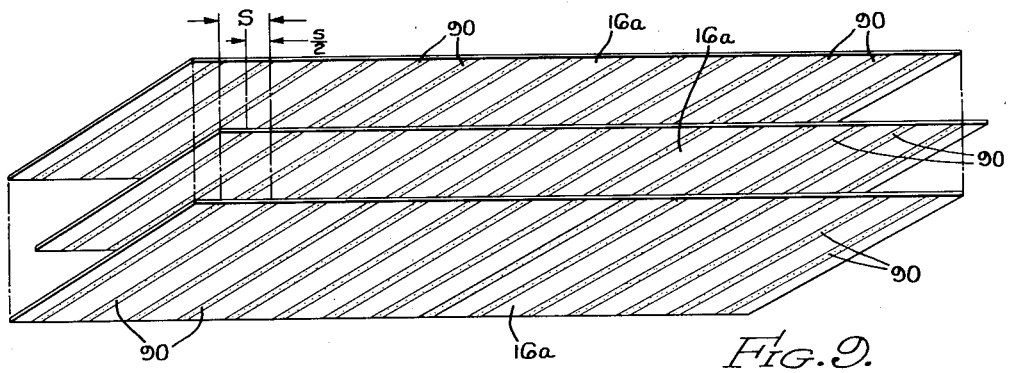
Figure 9 is a diagrammatic perspective view illustrating the relative positions of the core components when carrying out the modified method of this invention.

Figure 9 illustrates a modified method for insulating the sheets against welding more than two adjacent sheets together. In this embodiment of the invention, the copper comb members are dispensed with and in place thereof the undersides of the sheets 16a are provided with fingers or strips 90 of dielectric insulating material. The insulating material, which consists of bentonite-type masking clay, is preferably applied to the sheets in the form of a liquid, preferably in suspension in polyvinyl alcohol or some other suspending medium such as cellulose acetate, neoprene, polyvinyl chloride or "Glyptal" type lacquer. The suspension of masking clay is preferably sprayed onto the underside of the sheets 16a at spaced intervals corresponding to the desired spacing between welds, and is set thereupon by drying the same under infrared heat. The sheets are then perforated and cut to proper size.

Figure 11:
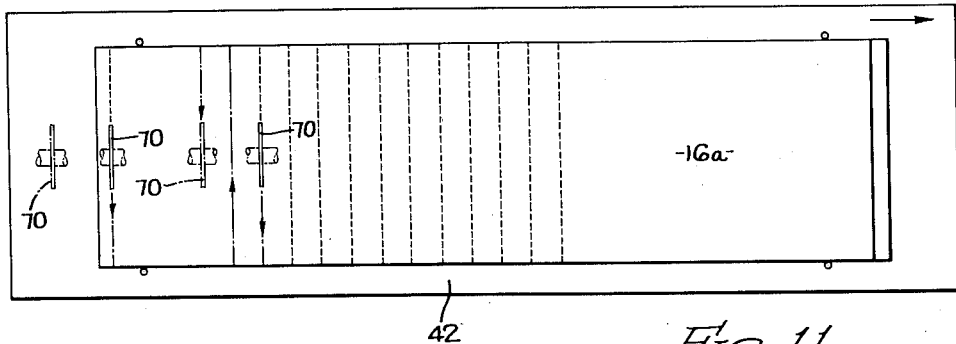
Figure 12:
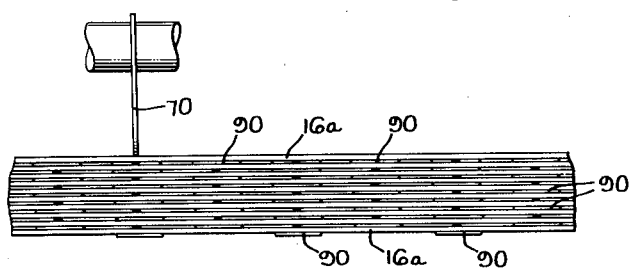
Figure 12 is a vertical sectional view illustrating the modified welding method.

The sheets 16a may be welded to form the honeycomb core by either the hand method or the semi-automatic method described above. In welding the sheets, they are alternately staggered a distance equal to onehalf the weld spacing, as shown in Figures 10 and 11, and here the sheets 16a themselves form the second electrode which cooperate with the wheel electrodes to complete the welding circuit.

Other materials may be used as a substitute for the masking clay, such as a punched paper or other dielectric sheet material which would serve as a welding mask. These masks are placed between the strips to be welded and indexed alternately to obtain the proper weld center lines.

While a specific embodiment of this invention has been shown and described, it is not intended to limit the same to the exact details of the construction set forth, and it embraces such changes, modifications and equivalents of the parts and their formation and arrangement as come within the purview of the appended claims.

We claim:

1. The method of making seam-welded honeycomb core comprising the steps of placing a section of corrugated metal foil on a set of spaced, substantially horizontally disposed fingers of electrically conductive material, so that the lower portions of the corrugations extend down between the fingers while the upper portions of the corrugations rest upon the fingers, placing a second set of fingers in the lower portions of said section, placing a second section of corrugated metal foil on said second set of fingers so that the lower portions of said second section are in alignment with and contacting the upper portions of the first-mentioned section, placing an electrode in at least one lower portion of said second section of foil at a location directly above at least one of the fingers of the first-mentioned set, moving said electrode along said lower portion substantially in alignment with the longitudinal axis of the respective finger of said first-mentioned set while passing electric current between said electrode and said finger through both sections of foil whereby to seam-weld abutting portions of said first and second sections together.

2. The method of making seam-welded honeycomb core comprising the steps of placing a section of corrugated metal foil on a set of spaced, substantially horizontally disposed fingers of electrically conductive material, so that the lower portions of the corrugations extend down between the fingers while the upper portions of the corrugations rest upon the fingers, placing a second set of fingers of electrically conductive material in the lower portions of said section, placing a second section of corrugated metal foil on said second set of fingers so that the lower portions of said second section are in alignment with and contacting the upper portions of the first-mentioned section, placing an electrode in at least one lower portion of said second section of foil at a location directly above at least one of the fingers of the first-mentioned set, moving said electrode along said lower portion substantially in alignment with the longitudinal axis of the respective finger of said first-mentioned set while passing electric current between said electrode and said finger through both sections of foil whereby to seam-weld abutting portions of said first and second sections together, successively moving said electrode along each of the remaining lower portions of said second section, substantially in alignment with the longitudinal axis of a respective finger, to seam-weld said first and second sections together at each location where the upper portions of said first-mentioned section and the lower portions of said second section abut, whereby to secure said sections together so as to form a series of cells between said first and second sections, removing said first-mentioned set of fingers from below said first-mentioned section of foil and placing them on the lower portions of said second section, placing a third section of corrugated metal foil on the fingers of said first-mentioned set so that the lower portions of the corrugations of said third section of foil are aligned with and contacting the upper portions of the corrugations of said second section of foil, successively moving said electrode along each of the lower portions of said third section of foil while passing an electric current between said terminal and said second set of fingers to weld said second and third sections of foil together so as to form a series of cells therebetween, removing said second set of fingers from below said second section of foil and placing them on the lower portions of said third section, placing a fourth section of corrugated metal foil on the fingers of said second form so that the lower portions of the corrugations of said fourth section rest upon the upper portions of the corrugations of said third section of foil, welding said third and fourth sections together so as to form a series of cells therebetween, and continuing to build up said core in thickness by welding on additional sections of corrugated foil to create additional series of cells.

3. In a method for producing metallic honeycomb core structures, the steps of: disposing a first set of spaced, interconnected metallic fingers below a first metallic corrugated sheet having alternating depressions and protrusions; disposing a second set of metallic fingers above said sheet with its fingers interposed between the fingers of said first set; superimposing a second metallic corrugated sheet having alternating depressions and protrusions over said fingers of said second set; placing an electrode above and in contact with the surface of said second sheet and in alignment with one of the fingers of said first set; and moving said electrode along said second sheet in alignment with the longitudinal axis of said finger of said first set while passing electric current between said electrode and said finger through both said first and second sheets to weld abutting portions of said first and second sheets together.

4. In a method for producing a preformed metallic honeycomb structure, the steps of: placing a first set of spaced, interconnected, conductive fingers below a first metallic, corrugated sheet constituted by alternating depressions and protrusions with the fingers of said first set located in the protrusions of said first sheet while said depressions depend between said fingers; placing a second set of interconnected, conductive fingers in superimposed relationship with said first sheet, said fingers of said second set being located in the depressions of said first sheet and interposed between said fingers of said first set; placing a second metallic, corrugated sheet characterized by alternating depressions and protrusions in overlying relationship with the fingers of said second set and with said fingers of said second set located in the protrusions of said second sheet; placing an electrode in at least one depression of said second sheet and in alignment with one of the fingers of said first set; and moving said electrode along said depression and along the longitudinal axis of said finger while passing electric current between said electrode and said finger through said sheets whereby to weld said sheets together.

References Cited in the file of this patent

UNITED STATES PATENTS

| | | |
|---|---|---|
| 2,078,006 | Lockwood | Apr. 20, 1936 |
| 2,163,590 | Ganahl et al. | June 27, 1939 |
| 2,324,435 | Smith | July 13, 1943 |
| 2,397,646 | Brown et al. | Apr. 2, 1946 |
| 2,445,801 | Partiot | July 27, 1948 |
| 2,452,805 | Sussemback | Nov. 2, 1948 |

FOREIGN PATENTS

| | | |
|---|---|---|
| 1,011,146 | France | Apr. 2, 1952 |